United States Patent
Charters

[15] 3,676,777
[45] July 11, 1972

[54] APPARATUS FOR AUTOMATICALLY TESTING INTEGRATED CIRCUIT DEVICES

[72] Inventor: Thomas H. Charters, Portland, Oreg.
[73] Assignee: Tektronix, Inc., Beaverton, Oreg.
[22] Filed: Aug. 10, 1970
[21] Appl. No.: 62,292

[52] U.S. Cl. ................................................................324/73 R
[51] Int. Cl. ...........................................................G01r 15/12
[58] Field of Search ..........................324/73 R, 158 R, 158 F

[56] References Cited

UNITED STATES PATENTS

| | | | |
|---|---|---|---|
| 3,418,573 | 12/1968 | Alford et al. | 324/73 R |
| 3,461,386 | 8/1969 | McCutcheon et al. | 324/158 R |
| 3,496,464 | 2/1970 | Tankersley | 324/73 R |

*Primary Examiner*—Randolph V. Rolinec
*Assistant Examiner*—R. J. Corcoran
*Attorney*—Buckhorn, Blore, Klarquist & Sparkman

[57] ABSTRACT

An integrated circuit test system is described including a programmable test fixture controlled by a computer for automatically performing D.C., dynamic, and functional tests on integrated circuit devices to provide 100 measurements per second with a rise time of 1 nanosecond. The test fixture includes a first circuit board on which a plurality of test probes are mounted, a second circuit board connected to such first board by connector pins and having a plurality of different loads, D.C. bias voltage sources, and associated switches mounted thereon for selectively connecting them to active connector terminals connected to the pins of the device under test, and a third circuit board having a socket for such device releasably connected to the load board. A fourth circuit board with loads mounted thereon may be attached to the socket board for testing extremely high speed devices and extends perpendicular through central openings in the other boards. The sampling probes are plugged into sockets on a grounded mounting ring attached to the probe board and extend radially outward from such ring in parallel to such probe board to reduce inductance and require less space. The load board is provided with a plurality of ground terminals positioned between adjacent active connector terminals for further reducing the inductance to ground.

22 Claims, 15 Drawing Figures

PATENTED JUL 11 1972 3,676,777

THOMAS H. CHARTERS
INVENTOR

BY
BUCKHORN, BLORE, KLARQUIST & SPARKMAN
ATTORNEYS 3,676,777

THOMAS H. CHARTERS
INVENTOR

BY
BUCKHORN, BLORE, KLARQUIST & SPARKMAN
ATTORNEYS

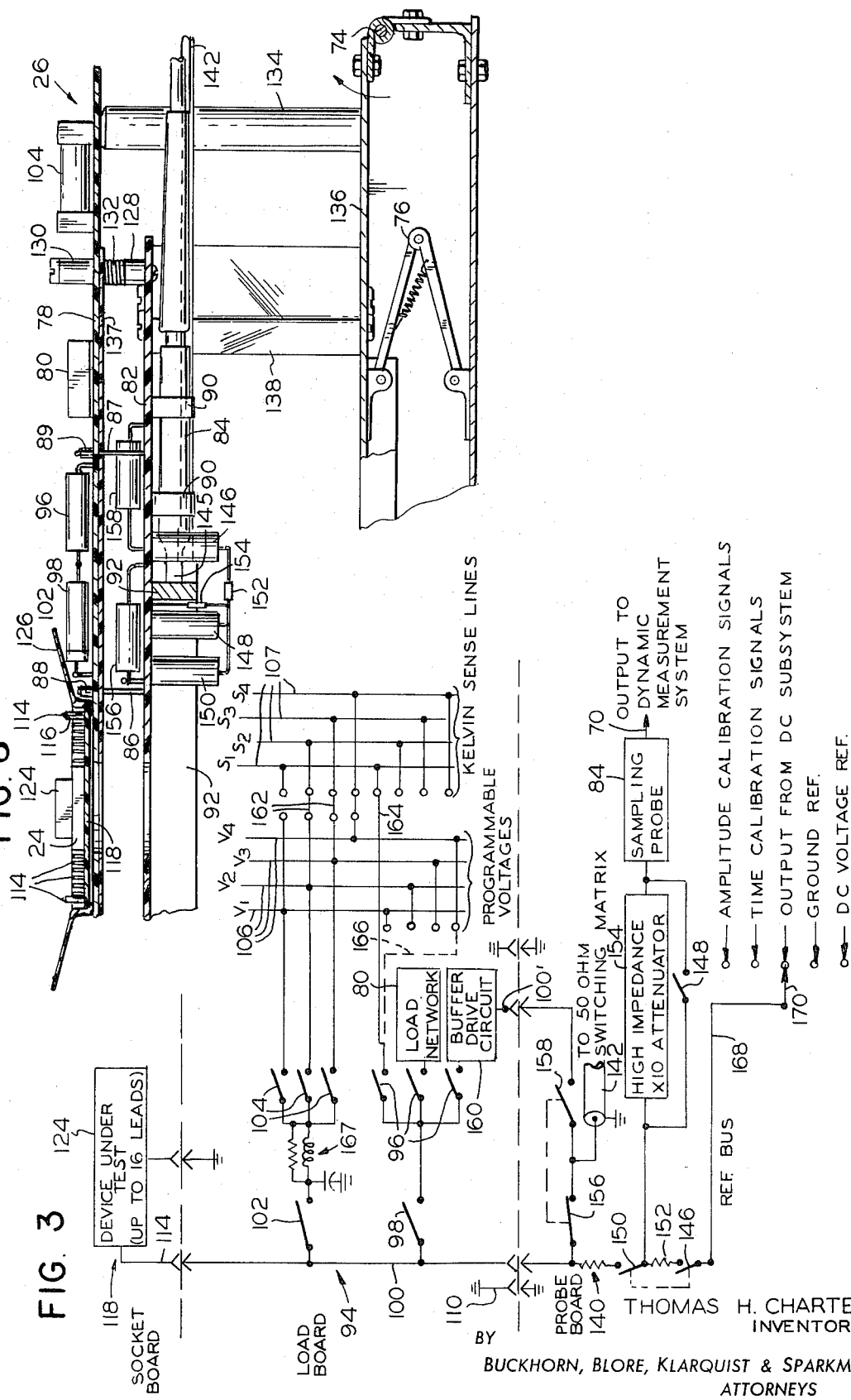

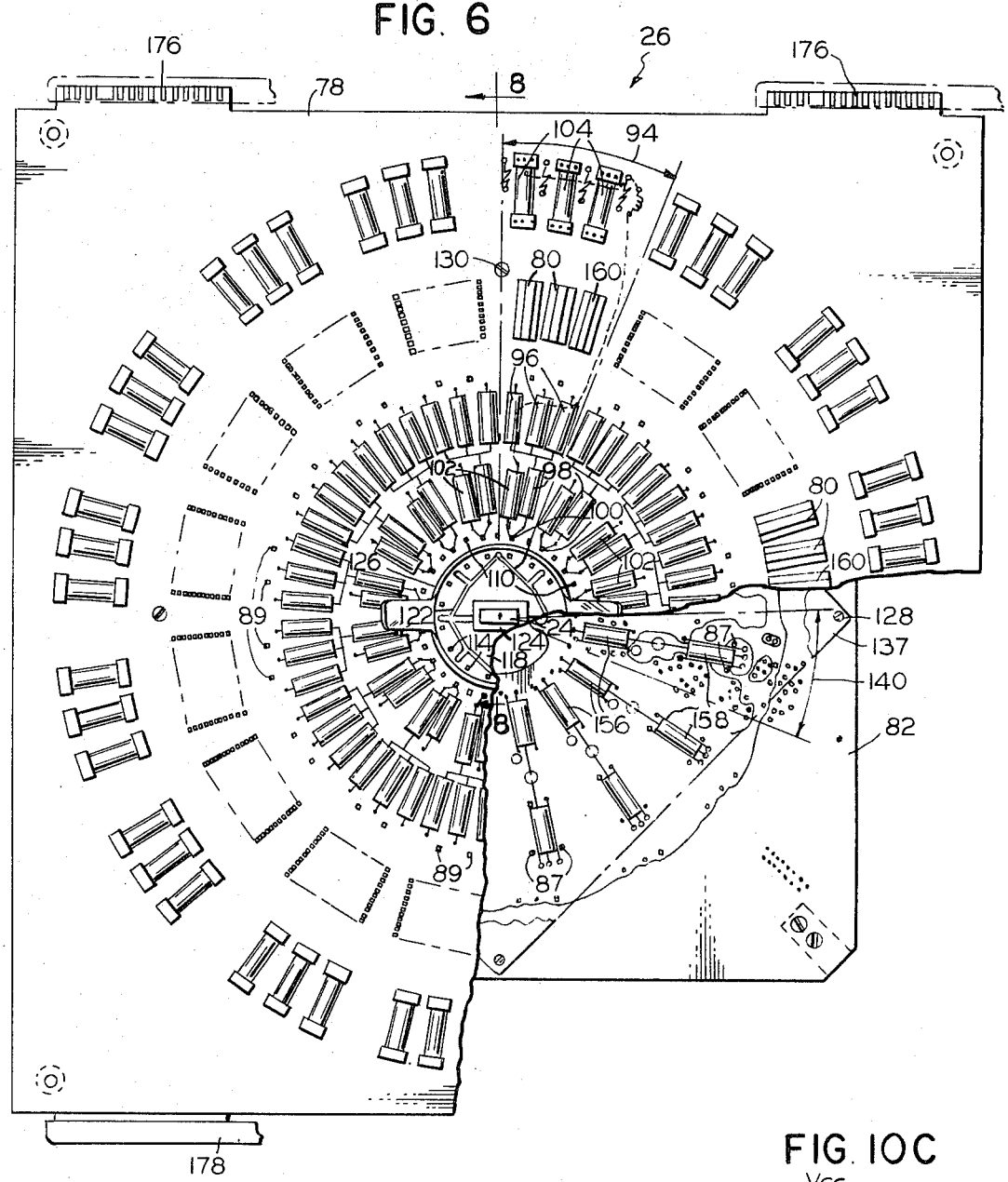

THOMAS H. CHARTERS
INVENTOR

BY BUCKHORN, BLORE, KLARQUIST & SPARKMAN
ATTORNEYS

APPARATUS FOR AUTOMATICALLY TESTING INTEGRATED CIRCUIT DEVICES

BACKGROUND OF THE INVENTION

The subject matter of the present invention relates generally to apparatus for automatically testing electronic devices, such as integrated circuits, transistors, and other semiconductor devices, and in particular to an improved test fixture for such apparatus. The test fixture includes a circuit board having a plurality of different loads and associated switches connected to each "active" terminal on such board which is "active" during the testing because it is connected to a pin of the socket containing the device under test provided on a small socket board releasably connected to such load board, and another circuit board extending parallel to the load board and connected thereto by connector pins such other board having a plurality of sampling probes and associated switches mounted thereon so that such probes extend radially outward from a common mounting ring parallel to such probe board. The apparatus of the present invention is especially useful for testing monolithic integrated circuit devices and may be automatically controlled by a digital computer which operates the switches on both of such circuit boards in accordance with a predetermined test program stored in such computer to perform a large number of tests on each device at high speed and with a fast rise time response.

Previous integrated circuit testers have employed test fixtures using a "performance" board to which are connected a plurality of separate individual probe boards having sampling probes mounted thereon so that such probe boards and associated probes extend perpendicular to the performance board. This causes considerable mounting and alignment problems due to the large number of probe boards, which in addition makes it easy to confuse the proper positions of such boards. This arrangement apparently also increases the capacitance and inductance of the test fixture so that such prior fixtures have a signal response rise time which is slower and, accordingly, are not able to test the fastest integrated circuits now available. Another disadvantage is that the probe boards and associated probes take up so much vertical space beneath the performance board that the operator cannot sit in a normal position with legs extending beneath the socket of the test fixture. The above disadvantages are overcome by the testing apparatus of the present invention.

Thus, by employing a common mounting ring for the sampling probes on the probe board and by employing ground terminals between the active connector terminals on the load board, the inductance to ground is greatly reduced in the present test fixture. Also, by mounting the switches and other components on the load board and probe board in such a manner as to reduce interconnection lead lengths and by employing reed switches, inductance and capacitance are further reduced. As a result of this reduced inductance and capacitance, the test apparatus of the present invention has an extremely fast rise time of about 1 nanosecond and is capable of performing over one hundred tests per second. Furthermore, the present test apparatus is extremely versatile since it employs the same load board for a whole family of integrated circuits merely by changing the small socket boards on which the different types of integrated circuit socket are mounted.

It is, therefore, one object of the present invention to provide an apparatus for automatically testing electronic devices, such as integrated circuits, which is highly accurate, extremely versatile, and can quickly perform a large number of different tests on a plurality of different devices, including D.C., dynamic, and functional tests.

Another object of the present invention is to provide an improved test fixture for use in such apparatus employing a common load board and a common probe board together with easily interchangeable socket boards for testing a plurality of different integrated circuit devices which has a fast rise time signal response and has fewer circuit boards, resulting in less mounting and alignment problems.

A further object of the present invention is to provide such a test fixture in which the common probe board extends parallel to the load board and has a plurality of probes mounted thereon extending parallel to the surface of such probe board to provide a more compact test fixture.

An additional object of the invention is to provide such an improved test fixture in which the common load board is provided with a plurality of ground terminals positioned between a plurality of active terminals connected to the socket pins of the device under test so that any two adjacent active terminals are separated by a ground terminal, and in which the sampling probes are plugged into connectors attached to a common mounting ring in order to reduce the inductance to ground.

Still another object of the present invention is to provide such a test fixture in which the common load board is provided with a plurality of different loads and associated switches for each pin of the device under test and such switches, as well as other switches associated with a plurality of different D.C. supply voltages for such pins, are automatically operated by a control computer in accordance with the predetermined test programs stored in such computer.

BRIEF DESCRIPTION OF THE DRAWINGS

Other objects and advantages of the present invention will be apparent from the following detailed description of the preferred embodiments thereof and from the attached drawings of which:

FIG. 3 is a schematic diagram of the electrical circuit of one segment of the programmable test fixture of the present invention used in the system of FIG. 2;

FIG. 6 is an enlarged plan view of the load circuit board in the text fixture of FIG. 4, with parts broken away to show a portion of the probe circuit board;

FIG. 8 is a partial vertical section view taken along the line 8—8 of FIG. 6;

FIGS. 10a, 10b and 10c are schematic diagrams of different loads which may be provided on the load circuit board of FIG. 6;

DESCRIPTION OF THE PREFERRED EMBODIMENTS

Figure 1:
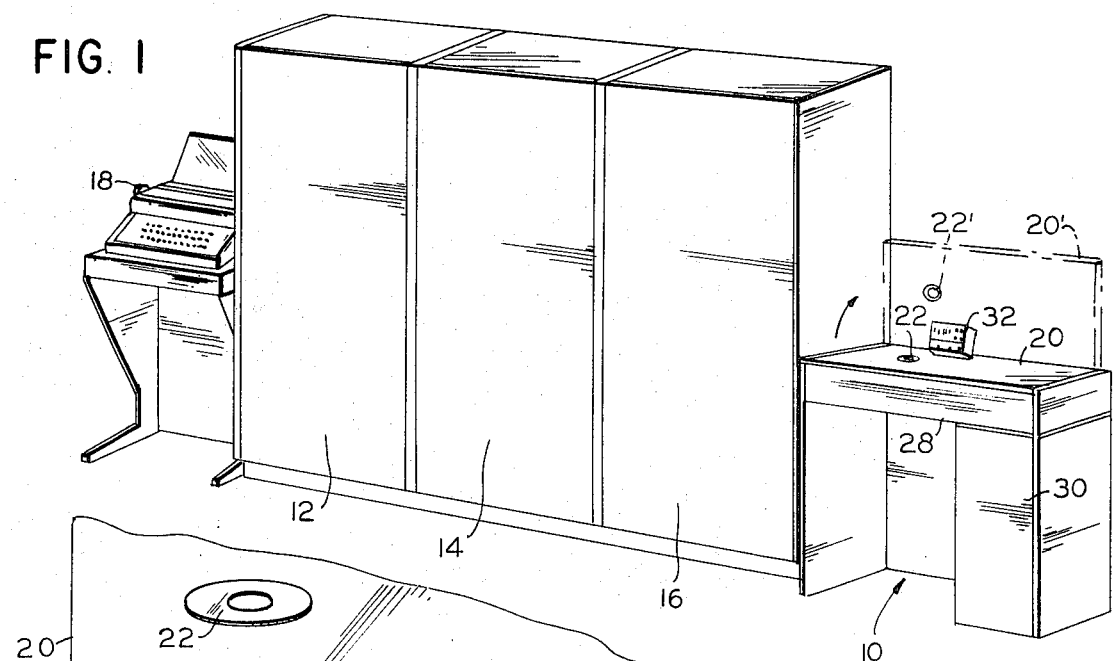
FIG. 1 is an oblique elevation view of the test apparatus of the present invention.
Figure 4:
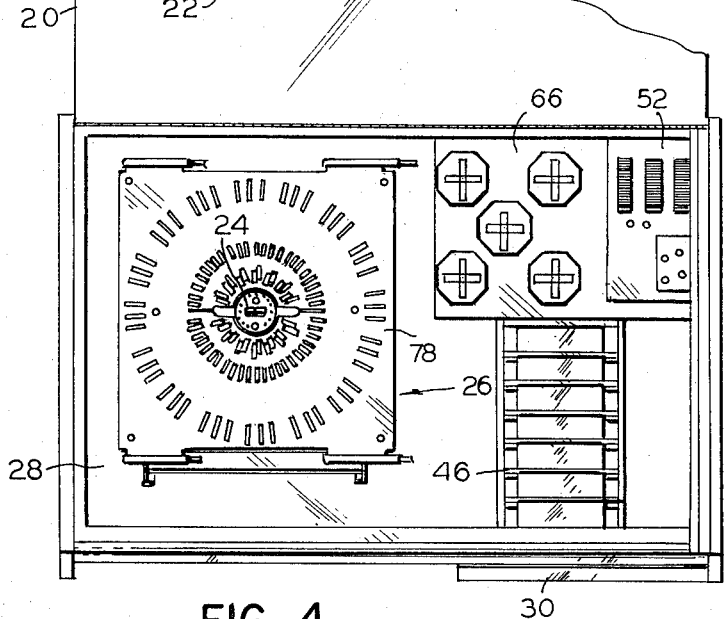
FIG. 4 is a plan view of the test station in the apparatus of FIG. 1 with its top shown in a raised position.

As shown in FIG. 1, the automatic test apparatus of the present invention includes a test station 10, three cabinets 12, 14 and 16 containing rack mounted test apparatus, and a computer input and readout means 18. The first cabinet 12 contains a digital computer and associated apparatus including magnetic tape drive units. The second cabinet 14 contains a programmable D.C. current supply and four programmable D.C. voltage power supplies, as well as two programmable pulse generators. The third cabinet 16 contains an electrical signal measurement system including a sampling type of cathode ray oscilloscope, a stop-start digital measurement unit and a program control unit which are connected to a programmable test fixture in the test station 10, as hereafter described. The computer input and readout means may include a Teletype typewriter for applying control inputs to the computer and for providing a hard copy printout.

The test station 10 is in the form of a desk-like console having a hinged top 20 which is provided with an aperture 22 through which the integrated circuit or other device under test is inserted into a socket 24 provided as part of a test fixture 26 contained within an upper portion 28 of the test station which is less than 6 inches thick. The test station also includes a side portion 30 containing sixteen sampling heads and associated multiplexer. As a result of its compact design, the test fixture 26 is supported above the lap of a seated operator so that his knees can be positioned directly beneath the aperture 22 containing the device under test to enable the operator to be in a normal, comfortable sitting position during testing. A test indicator device 32 is removably mounted, such as by way of a magnetic base, to the upper surface of the top 20 of the test station. The indicator device 32 may be a go, no-go type of indicator provided with light bulbs for indicating when the device under test is within upper and lower tolerance limits and when it is above or below such limits. Such indicator device is connected to a digital counter in the stop-start measuring unit of the dynamic measuring system within the third cabinet 16, hereafter described with respect to FIG. 11.

Figure 2:
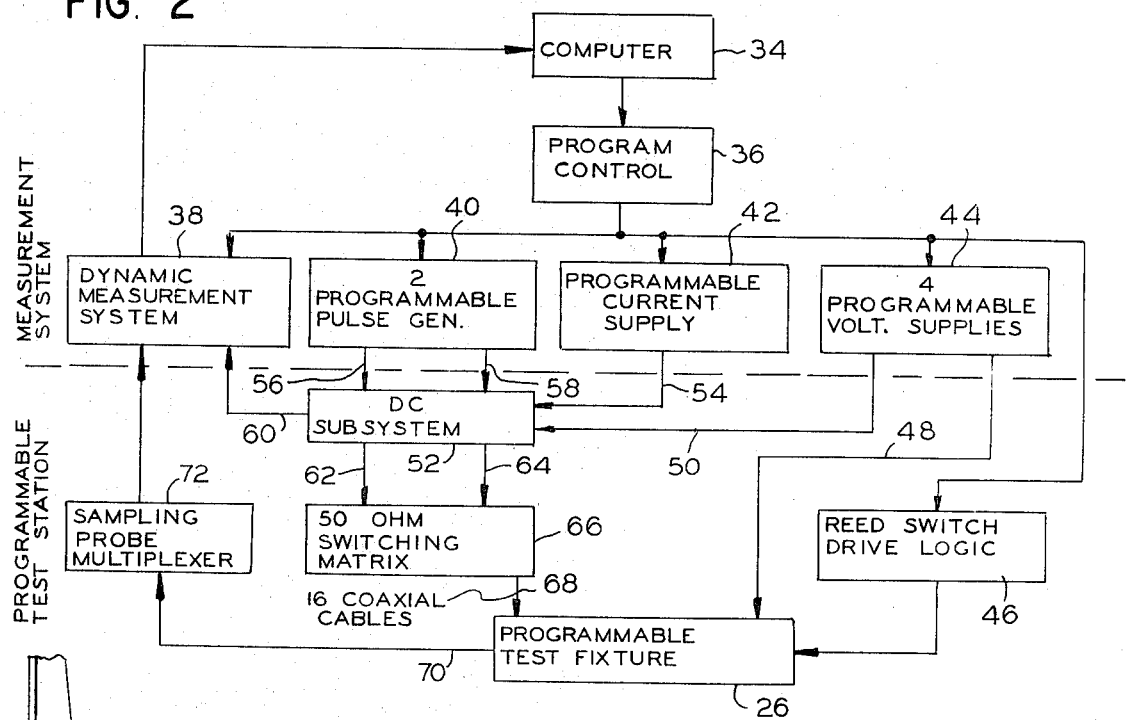
FIG. 2 is a schematic diagram of the electrical system of the test apparatus of FIG. 1.

As shown in FIG. 2, the electrical system for the test apparatus of FIG. 1 includes a digital computer 34 whose output is connected to a program control unit 36. The outputs of the control unit 36 are fed to a dynamic measurement system 38, a pair of programmable pulse generators 40, a programmable current supply 42, and four programmable D.C. voltage supplies 44. In addition, the output of the program control unit 36 is also connected to a reed switch drive logic unit 46 whose output is connected to the magnetic actuating coils of a plurality of reed switches mounted on the circuit boards of the test fixture 26.

One set of outputs of the four voltage supplies 44 are connected through conductors 48 to the test fixture 26 for applying four different D.C. voltages thereto, while another set of outputs of such voltage supplies are connected through conductors 50 to a D.C. subsystem unit 52. The D.C. subsystem 52 measures the D.C. voltage and current characteristics of the device under test, as is shown in copending U.S. patent application, Ser. No. 879,393, filed Nov. 24, 1969, by J. J. McCormick now U.S. Pat. No. 3,617,881. The D.C. subsystem is also connected to the output of the current supply 42 through conductor 54 and to the two outputs of the programmable pulse generators 40 through conductors 56 and 58. One of the outputs of the D.C. subsystem 52 is connected through conductor 60 to the dynamic measurement system 38 for indicating the values of the D.C. measurements made by the D.C. subsystem. The D.C. subsystem 52 is also connected through conductors 62 and 64 to a 50 ohm coaxial cable switching matrix 66. The outputs of the switching matrix 66 are connected through sixteen coaxial cables 68 to the test fixture 26 for supplying pulses from the pulse generators 40, as well as D.C. voltages from supplies 44 and D.C. current from supply 42, to such test fixture and for transmitting test signals back from the test fixture to the D.C. subsystem. The test fixture 26 is also connected at the outputs of its sampling probes through 16 coaxial cables 70 to a sampling probe multiplexer 72. The output of the multiplexer 72 is connected to the dynamic measuring system 38 for processing the sampled output signals with a sampling type of cathode ray oscilloscope and stop-start measurement unit shown in greater detail in FIG. 11. The output of the measurement system 38 is connected to the computer 34 for storing the results of the test measurements on magnetic tape or other suitable means.

Figure 5:
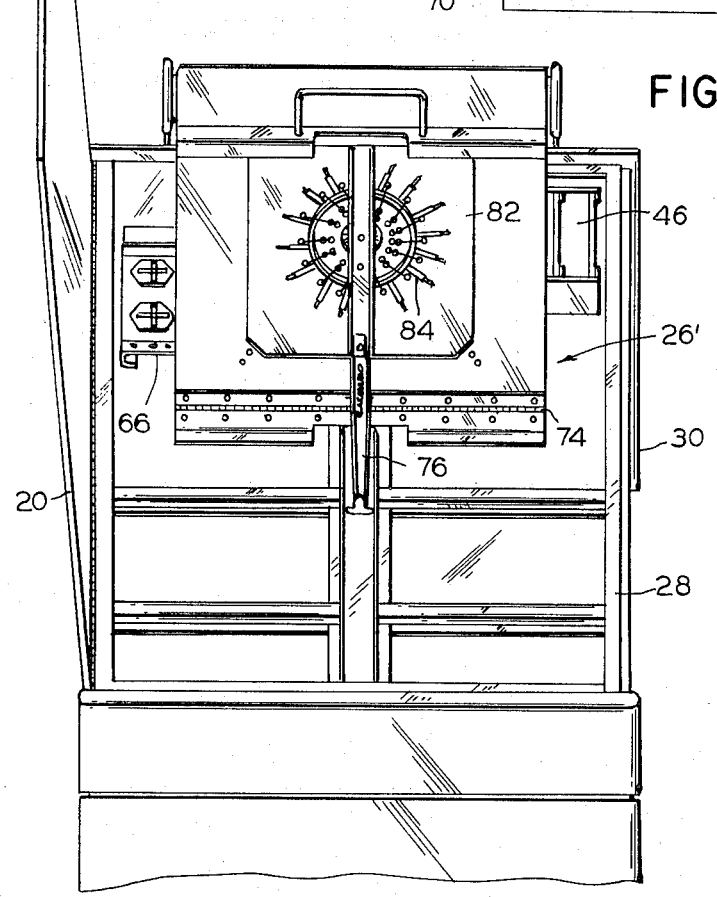
FIG. 5 is an oblique elevation view of the test station of FIG. 4 with the test fixture shown in a raised position.

As shown in FIGS. 5 and 8, the programmable test fixture 26 is pivotally mounted on a hinge 74 for movement between the lowered position 26 of FIG. 8 and the raised position 26' of FIG. 5 to enable access to the bottom of such test fixture. A spring biased link 76 holds the test fixture 26 in either of these positions.

Figure 7:
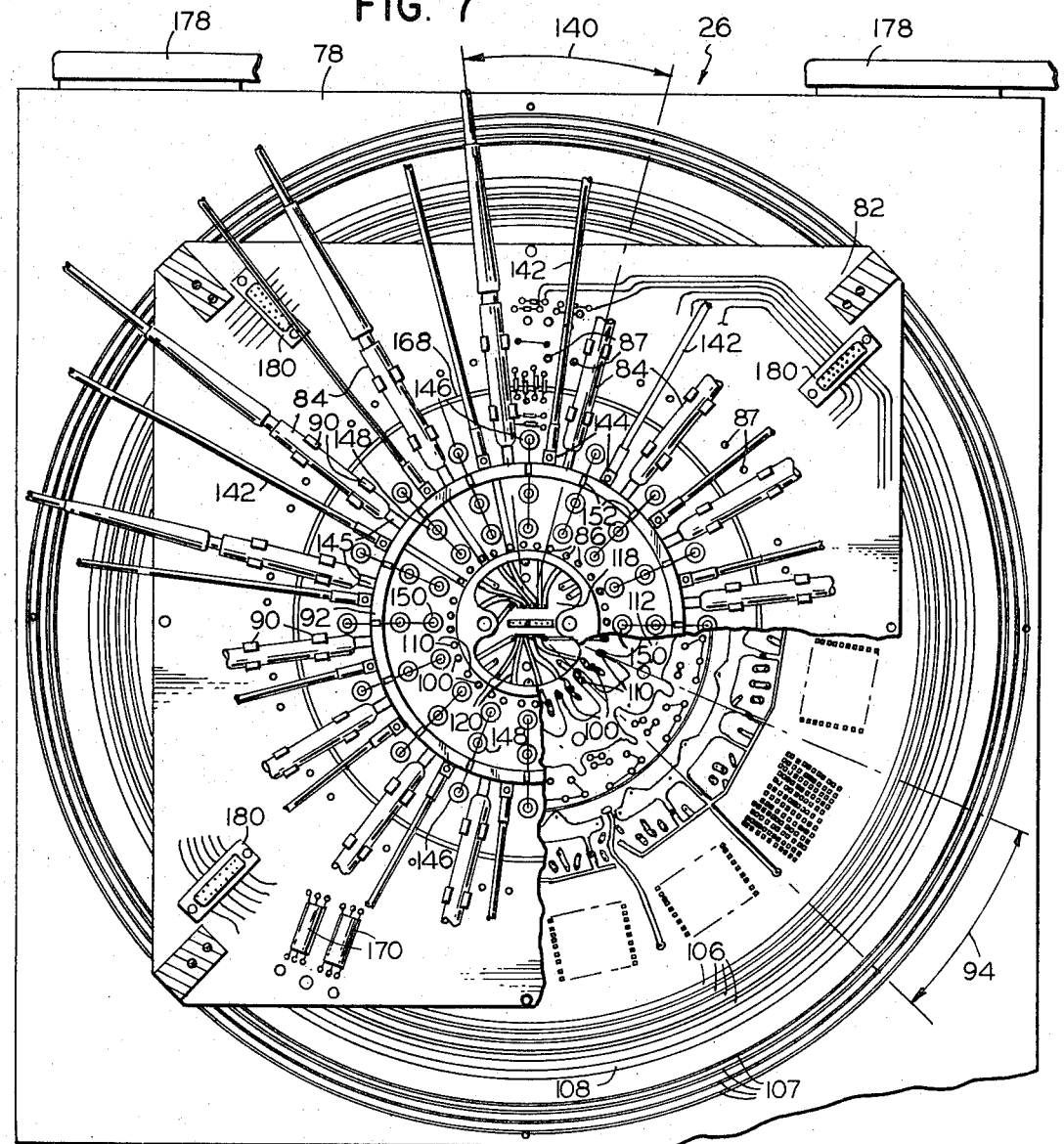
FIG. 7 is an enlarged view of the bottom surface of the probe circuit board in FIG. 6, with parts broken away to show a portion of the load circuit board.

As shown in FIGS. 6, 7 and 8, the test fixture 26 includes an etched circuit board 78 on which a plurality of different loads 80 are mounted so that it is hereafter called a "load board," and another etched circuit board 82 on which a plurality of sampling probes 84 are mounted so that it is hereafter called a "probe board." The load board extends substantially parallel to the probe board and is connected to such probe board by a plurality of connecting pins 86 and 87 which are attached to the probe board and are inserted into pin receptacles 88 and 89 attached to the load board, as shown in FIG. 8. The connecting pins are arranged in two circular groups including an inner group 86 and an outer group 87. The sampling probes 84 are attached to the probe board 82 by mounting clips 90 of a suitable plastic material so that such probes extend parallel to such probe board and radially outward from a common ground mounting ring 92 attached to the bottom surface of the probe board. Thus, since the sampling probes 84 extend parallel to the probe board 82 and such probe board is mounted parallel to the load board 78, an extremely compact test fixture 26 is formed with a thickness of about 4 inches which enables the operator to sit directly beneath such test fixture, as previously described.

The load board 78 is divided into 16 segments, each covering an angle of 22.5°, which are uniformly spaced about 360° to form a circular array. One of these segments 94 may include three different loads 80, each mounted on a plug-in unit inserted into an integrated circuit socket attached to the load board. The loads 80 are each connected to one terminal of a different one of three reed switches 96. The other terminals of each of the reed switches 96 is connected in common to one terminal of a coupling reed switch 98 whose other terminal is connected through an "active" connector 100 to one of the 16 leads of the socket 24 holding the device under test so that connector 100 is "active" in the testing of such device. In addition, the active connector 100 is also connected through a second coupling reed switch 102 to the common input terminal of three other reed switches 104 whose other terminals are connected to three different D.C. supply voltage sources. Four different supply voltages are provided on four concentric conductor rings 106 provided on the bottom side of the load board, as shown in FIG. 7. Four concentric sense lines 107 are also provided on the load board for sensing the voltages applied to the supply voltage rings 106. A common reference voltage ring 108 which may be grounded is also provided between the sense lines and the supply voltage rings.

As shown in FIGS. 6 and 7, a plurality of ground connectors 110 are provided between the active connectors 100 so that each pair of adjacent active connectors is separated by a ground connector and all of such ground connectors are connected to a common ground strip 112 on the lower side of the load board 78, as shown in FIG. 7. This greatly reduces the inductance to ground of each active connector. Both the active connectors 100 and the ground connectors 110 include the inner group of pins 86 extending between the load board and the probe board. In addition, the active connectors 100 also include another set of connecting pins 114 which, as shown in FIG. 8, are fastened to the load board 78 and extend upward into pin receptacles 116 attached to a third etched circuit board 118 on which the socket 24 is mounted, hereafter referred to as a "socket board." As shown in FIG. 7, the active connectors 100 are connected to the 16 pins of the socket 24 through lead strips 120 on the bottom side of the socket board, while at least some of the ground connectors 110 are connected to a common ground strip 122 on the upper surface of such socket board shown in FIG. 6.

A monolithic semiconductor integrated circuit 124, or other electronic device under test, is mounted in the socket 24. This integrated circuit can have up to 16 connecting pins which are connected through the socket 24 to the lead strips 120. As shown in FIG. 8, the socket board 118 may be contained within a plastic ring 126 having gripping tabs for quick removal and replacement of such socket board with another socket board designed for use with a different type of integrated circuit.

The load board 78 can also be replaced with a load board of another type for use with a different family of integrated circuit devices. Thus, the load board 78 is releasably secured to the probe board 82 over four guide posts 128, each attached at one end to such probe board and extending through an aperture in the load board. A threaded nut 130 is attached to the other end of the guide post to hold the load board thereon. A coil spring 132 provided about the post 128 is compressed between the load board 78 and a shoulder on such post to resiliently hold the load board against a stop rod 134 attached to a metal base plate 136 supporting the entire test fixture 26. A sheet of plastic material 137 is provided on the guide posts 128 under the load board to insulate the printed circuit on the bottom side of such load board from the components on the probe board. The base plate 136 is pivoted on hinge 74 and held by spring biased link 76, as mentioned previously. The probe board 82 is fixedly secured to the base plate 136 by a mounting spacer 138 and screws threaded into the opposite ends of such spacer for attachment of the probe board and the base plate thereto, as shown in FIG. 8.

The probe board 82, shown in FIGS. 6 and 7, is also divided into 16 segments of 22.5° each uniformly spaced 360° about the center of such board to provide a circular array. One of such segments 140 is shown in detail and includes one sampling probe 84 as well as one coaxial cable 142 and associated coaxial connector 144. The sampling probes are mounted by plug-in connectors 145 on the common ground ring 92, while the coaxial cable connectors are mounted on the probe board outside such ground ring between adjacent pairs of sampling probes. Three reed switches 146, 148 and 150 are also mounted on the bottom side of the probe board 82 extending perpendicular thereto with the first reed switch 146 positioned outside the mounting ring, and the other two reed switches 148 and 150 positioned inside the mounting ring. The first reed switch 146 is connected through a coupling resistor 152 over the ground ring to the other two reed switches 148 and 150, and the other terminal of switch 148 is connected to the input of the sampling probe, as shown in FIG. 8. In addition, a high impedance attenuator network including an attenuation resistor 154 is connected in parallel with reed switch 148 so that when such reed switch is open it attenuates the signal applied to the sampling probe by a factor of ten. Another pair of reed switches 156 and 158 are attached to the upper surface of the probe board 82, as shown in FIG. 8. Switch 156 connects the end of the coaxial cable 142 to the active connector 100 at one of the pins 86, while the other switch 158 connects such coaxial cable to a buffer drive circuit 160 which may be employed in place of one of the loads 80, such buffer drive circuit being an integrated circuit device having its output connected to the device under test for functional testing. The connection of the coaxial cable 142 and switch 158 to the buffer drive circuit 160 is made through an active connector 100' formed by one of the outer group of pins 87.

As shown in FIG. 3, the circuit of a probe board segment 140 and the circuit of a load board segment 94 are connected through the active connector 100 to one of the active pins 114 on the socket board 118. The physical positions of the circuit components and their functions has already been described with respect to FIG. 8. Also, it should be understood that since the device under test 124 has up to 16 leads, there are 16 load board segments and also 16 probe board segments having electrical circuits similar to those shown in FIG. 3.

The single switch 98 or 102 is connected in series with the three selector switches 96 or 104 in order to reduce the total switch capacitance. Each of these switches is a magnetically actuated reed switch whose actuating coils (not shown) are operated by the computer 34 of FIG. 2 through the reed switch drive logic unit 46. Reed switches 104 are connected to the D.C. supply voltage lines 106 which may also be connected to the Kelvin sense lines 107 by interconnections 162, as shown in FIG. 3. Thus, switches 104 may be used to apply a D.C. supply voltage to the device under test and to sense the value of the applied D.C. voltage during D.C. testing of such device. The D.C. characteristics of the device under test are measured through the coaxial cable 142 by the D.C. subsystem 62, as previously described. Reed switches 96 may all be connected to load networks 80 of different characteristics, but one may be connected to the buffer drive circuit 160, as mentioned previously, and another to the Kelvin sense lines through interconnections 164 or to one of the D.C. voltage supply lines through interconnection 166. This enables the fourth D.C. supply voltage $V_4$ to be applied to the device under test through switch 96 and interconnection 166 or it enables the sense line $S_1$ to sense the value of the D.C. supply voltage $V_1$ as applied to the device under test after attenuation by the coupling impedance 167 connected between switch 102 and switches 104. Thus, the load board is extremely versatile and can perform many different tests with a minimum of components.

The probe board segment 140 also employs magnetically actuated reed switches 146, 148, 150, 156 and 158 whose actuating coils (not shown) are operated by the computer 34 of FIG. 2 through the reed switch drive logic unit 46. Thus, when a dynamic measurement of, for example, the switching speed of the device under test is to be made, the sampling probe 84 is connected at its input by switch 150 to the device under test. This enables the sampling probe to take samples of different portions of successive switching signals and to reproduce the waveform of such switching signals as a low frequency signal display on a sampling oscilloscope in the dynamic measurement system 38. The rise time of such sample signal is measured with a start-stop logic circuit and digital counter to determine such switching speed, hereafter described with respect to FIG. 11.

A reference bus line 168 provided as an annular strip on the bottom side of the probe board is connected through switch 146 to coupling resistor 152. This reference bus line 168 is connected through a relay switch 170, formed by several switches on the bottom of the probe board, to one of five different input terminals. These five input terminals are connected, as shown in FIG. 3, to an amplitude calibration signal source, time calibration signal source, the output of the D.C. subsystem 52, a ground reference, and a D.C. voltage reference.

FIGS. 10a, 10b and 10c show three different load impedances 80', 80'', 80''', respectively, which may be employed as the loads connected to the load board 78 for different types of integrated circuits. Thus, load 80' is employed for resistor to transistor logic circuits, while load 80'' is employed for diode to transistor logic circuits, and load 80'''' is employed for transistor to transistor logic circuits.

Figure 9:
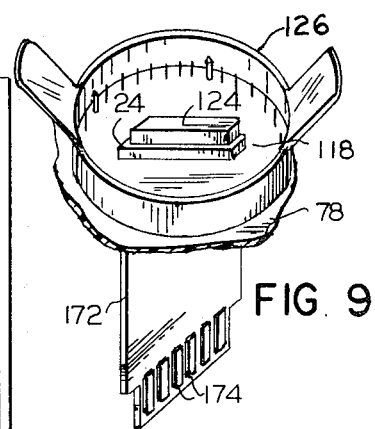
FIG. 9 is an enlarged oblique elevation view of the socket circuit board of FIG. 8 showing an auxiliary load board connected to such socket board.

As shown in FIG. 9, in addition to loads 80 on the main load board 78, a fourth etched circuit board 172 may be used to provide an auxiliary load board which is attached to the bottom of the socket board 118 for testing extremely high speed integrated circuits. The auxiliary load board 172 extends perpendicular to the socket board 118 through the central openings provided in the load board and the probe board. The different loads, such as those of FIGS. 10a, 10b, and 10c, are wired directly to the auxiliary load board 172 to position such loads as close as possible to the device under test, thereby reducing series inductance and shunt capacitance to enable the measurement of extremely high frequency switching signals having a rise time of down to 1 nanosecond. Thus, the auxiliary load board 172 mounted on the bottom of the socket board and connected to such socket board by jumper wires (not shown). The bottom edge of the auxiliary load board is provided with terminals 174 which plug into a connector receptacle.

Four terminal projections 176 are provided on the edges of the load board 78 for connection to connector receptacles 178, as shown in FIG. 6. These terminals 176 connect the load board to the reed switch drive logic unit 46 and the programmable voltage supply 44. Similarly, four plug-in connectors 180 are provided on the bottom of the probe board for connection to the reed switch drive logic unit, the voltage supply 44, and to the other signal sources connected to reed switch 170 of FIG. 3. It should be noted that the pulse generators 40, the current supply 44, and the D.C. subsystem 52 are connected to the probe board through the coaxial cables 142.

Figure 11:
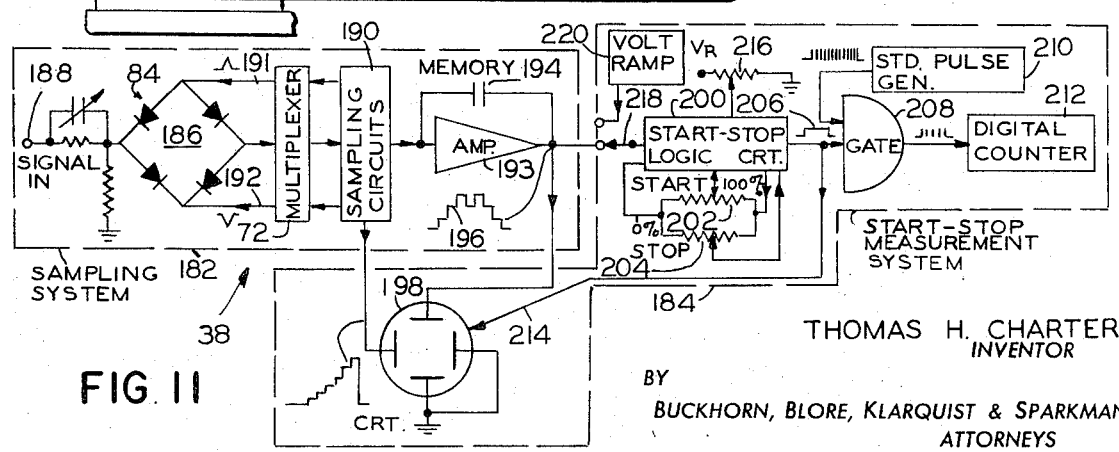
FIG. 11 is a simplified schematic diagram of the electrical circuit of the sampling system and stop-start measurement system forming the dynamic measurement system in FIG. 2.

As shown in FIG. 11, the dynamic measurement system 38 includes a sampling system 182 and a start-stop measurement system 184. The sampling system 182 may be similar to that shown in U.S. Pat. No. 3,248,655 of J. R. Kobbe et al., issued Apr. 26, 1966. Briefly, such sampling system includes a sampling gate 186 formed by a four-diode bridge connected at its input to a signal input terminal 188 and connected at its output through the multiplexer 72 to sampling circuits 190 of a sampling type cathode ray oscilloscope, referred to in greater detail in the above-mentioned Kobbe patent. The sides of the sampling gate 186 are connected through leads 191 and 192 to the interrogation pulse generator within the sampling circuit 190 which applies gating pulses to the sampling gate at different times determined by a stairstep ramp voltage therein to sample different portion of the input signal waveform. The gating pulses momentarily render the sampling gate conducting by overcoming a quiescent reverse bias voltage on the bridge diodes. As a result, a sample portion of the high frequency input signal applied to input terminal 188 is transmitted through the diode bridge and the sampling circuits to the input of a ratchet memory circuit 193 and 194. The memory circuit includes a high gain inverter amplifier 193 having its output connected to its input in a negative feedback loop by a memory capacitor 194. Each sample pulse transmitted to the memory is added to the previous voltage on the memory capacitor 194 to produce a step voltage output signal 196 which is a low frequency reproduction of the waveform of the high frequency input signal applied to input terminal 188. This sampling output signal is applied to the vertical deflection plates of a cathode ray tube 198 whose horizontal deflection plates are connected to the stairstep ramp signal produced by the sampling circuit for display of the sampling output signal waveform on the phosphor screen of such tube.

The start-stop measurement system 184 is shown in greater detail in U.S. Pat. No. 3,359,491 of S. R. McCutcheon, issued Dec. 19, 1967. This system is capable of measuring both amplitude and time characteristics of the sampling output signal 196 and includes a start-stop logic circuit 200 having its input connected to the output of memory 193 and 194. The logic circuit 200 automatically determines the voltage of maximum and minimum limits set on the output signal 196, stores such voltages, and applies these voltages to the opposite ends of a pair of parallel potentiometers 202 and 204 as zero percent and 100 percent voltages. The start potentiometer 202 has its movable contact connected to the input of a start comparator in the start-stop logic circuit 200, while the stop potentiometer 204 has its movable contact connected to the input of a stop comparator in such logic circuit. In order to measure the rise time of the sampling output signal 196, such signal is compared in the start comparator with a voltage on the movable contact of potentiometer 202 corresponding to 10 percent of the total voltage on such potentiometer to start an output gate pulse 206. This gate pulse is stopped by comparing in the stop comparator the output signal 196 with a voltage produced by a 90 percent setting of the movable contact on potentiometer 204. The gate pulse 206 is applied to one input of an AND gate 208 whose other input is connected to a standard pulse generator 210 which may be the interrogation pulse generator of the sampling circuit 190. The pulse generator 210 produces a plurality of standard pulses of uniform time duration and known frequency so that the number of pulses produced at the output of the gate 208 during the width of the gate pulse 206 corresponds to the rise time of the sampling output signal 196.

The output pulses of the gate 208 are fed to a digital counter 212 which counts such output pulses and indicates by Nixie tubes or other indicator devices the numerical value of the rise time or other characteristic being measured. At the same time, the start-stop gate pulse 206 is also transmitted to a Z-axis input 214 of the cathode ray tube 198 to cause a momentary increase in brightness of the trace produced on such tube corresponding to the output signal waveform 196. Thus, the increased brightness portion of the trace corresponds to that portion of the sampling output signal being measured, such as the rise time portion between the 10 percent and 90 percent levels on the leading edge of such output signal.

In order to make voltage amplitude measurements, the start-stop logic circuit 200 is operated somewhat differently than described above. A reference voltage potentiometer 216 connected to the logic circuit 200 is adjusted until the 100 percent voltage point is set at the desired amplitude level of the sampling output signal 196 and the zero percent voltage level remains the quiescent starting voltage of such output signal. This 100 percent point can be easily observed on the cathode ray tube 198 due to intensification by the gate pulse 206, even though the voltage value of the setting on potentiometer 216 is not known. Once potentiometer 216 is properly set, a switch 218 connected to the input of the comparators in the start-stop logic circuit is moved to the other position connecting such input to a standard voltage ramp generator 220. When this happens, the start-stop logic circuit 200 compares a linear ramp output voltage of known slope produced by ramp generator 220 with the zero percent start voltage and with the 100 percent stop voltage set by potentiometer 216, as more fully described in the above-mentioned McCutcheon patent. As a result, another gate pulse 206 is produced whose width corresponds to the voltage amplitude of the portion of the output signal 196 being measured. Therefore, the digital counter now indicates the voltage amplitude of such measured portion. Thus, it can be seen that the dynamic measuring system of FIG. 11 automatically measures either the time or amplitude characteristics of extremely high frequency signals, such as are produced by an integrated circuit or other semiconductor device under test. It should be noted that when D.C. tests are made on the integrated circuit, the test signal output voltage of the D.C. subsystem 52 may be transmitted by conductor 60 of FIG. 2 directly to the input 188 of the sampling system 182 to measure the value of such test signal.

Figure 12:
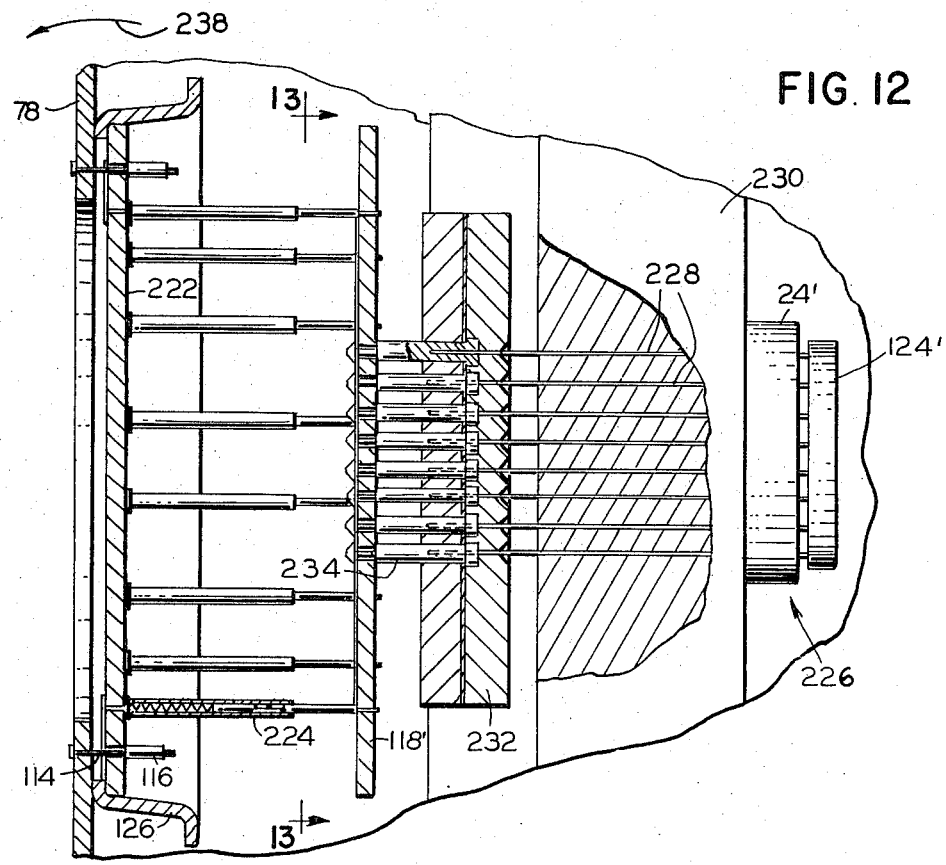
FIG. 12 is an enlarged partial section view of another embodiment of the socket board employed with the test fixture of FIGS. 4 to 8 which is connected to a device under test positioned within an environmental test chamber.
Figure 13:
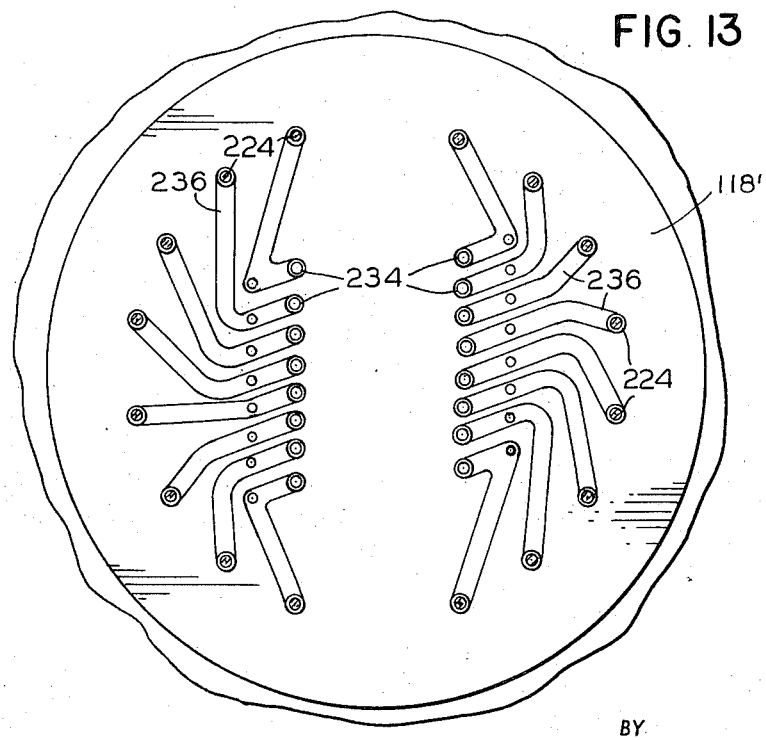
FIG. 13 is a vertical section view taken along the line 13—13 of FIG. 12.

Another embodiment of the present invention is shown in FIGS. 12 and 13, which is similar to that previously described except it employs a modified socket board 118'. The modified socket board is connected to an adapter circuit board 222 by spring biased plunger members 224, each having one end fixedly attached to such socket board on the bottom surface thereof. The adapter board 222 is held within the plastic ring 126 and mounted on connecting pins 114 in a similar manner to the socket board 118 of FIG. 8. The movable end of the plungers 224 makes electrical contact with conducting areas on the adapter board 222 which are connected through pins 114 to the load board 78, in the manner previously described. The integrated circuit device under test 124' and its associated socket 24' are mounted within a sealed environmental test chamber 226 in order to subject the device to variations of humidity, temperature, pressure, and other changes which may affect its operation.

A plurality of feed-through conductors 228 extend through the wall 230 of the test chamber. One end of each of the feed-through conductors 228 is connected to a pin of the integrated circuit socket 24', while the other end of such feed-through conductors is inserted into a connector socket 232 which is removably attached to the exterior of the wall 230. A plurality of receptacle terminals 234, corresponding in number to the feed-through conductors 228, are soldered to the socket board 118' in position to receive such feed-through conductors. As shown in FIG. 13, the receptacle terminals 234 are connected to lead strips 236 provided on the bottom surface of the modified socket board 118' to interconnect such receptacle terminals with the plungers 224 attached to the opposite side of such socket board.

The above-described embodiment of FIGS. 12 and 13 enables pivoting of the test fixture including the probe board, load board 78, and the adapter board 222 with respect to the modified socket board 118' in the direction of the arrow 238 between horizontal and vertical positions. The spring biased plungers 224 insure that good electrical contact is made between the modified socket board 118' and the adapter board 222 when such adapter board is pivoted into the vertical position shown in FIG. 12. This enables the loads, sampling probes, and other components mounted on the load board 78 and the probe board 82 to be replaced more easily. An automatic feeding mechanism can be employed for inserting the integrated circuit 124' into the socket 24' within the environmental chamber, such as the automatic feeding system manufactured by Delta Design, Inc., of LaMesa, Calif.

It will be obvious to those having ordinary skill in the art that many changes may be made in the details of the above-described preferred embodiments of the present invention without departing from the spirit of the invention. For example, the load board 78 and the socket board 118 can be modified to provide four separate active connectors per segment connected to four different pins of the device under test 124 in place of the single active connector 100 shown in FIG. 3. One of these active connectors is connected through switch 102 to the voltage supplies 106 and sense lines 107, while another active connector is connected through switch 98 to the loads 80, buffer drive circuits 160, etc. The third and fourth active connectors are connected through two additional reed switch relays (not shown) to the probe board 140 at the common connection of switch 156 and switch 150 to enable either an input pin or an output of device 124 to be connected to such common connection. In some cases it may also be desireable to provide short circuit connections between the input pin and the supply voltage pin, and between the output pin and the load pin on the socket board. Therefore, the scope of the present invention should only be determined by the following claims.

I claim:

1. Test apparatus for automatically testing electronic devices, in which the improvement comprises:
   probe means including a first circuit board having a plurality of signal input means, a plurality of signal measurement probes and a plurality of first switch means mounted on and electrically connected to said first board for selectively connecting said input means and said probes to the terminals of an electronic device under test, each of said probes being mounted with its longitudinal axis substantially parallel to said first board;
   measurement means connected to said probes;
   load means including a second circuit board electrically connected to said first board, said load means having a plurality of different D.C. bias means, a plurality of different load means and a plurality of second switch means mounted on said second board for selectively connecting said bias means and said load means to said device under test;
   socket means for releasably connecting said device under test to active terminals on said second board, said active terminals being separated from each other by ground terminals on said second board; and
   control means for automatically operating said first and second switch means in accordance with a predetermined test program to sequentially perform a plurality of different tests on said device under test.

2. Test apparatus in accordance with claim 1 in which the socket means is releasably attached to the second circuit board and includes a socket member and a plurality of connectors, at least some of said connectors being active connectors connected to the active terminals on said second board, said active terminals being electrically connected to socket contacts on said socket member which engage the terminals of the device under test, and other connectors being ground connectors connected to the ground terminals on said second board which are electrically grounded and are positioned between adjacent active terminals.

3. Test apparatus in accordance with claim 1 in which the first and second boards are each divided into the same number of segments, all the segments of the first board being similar and each segment having a probe, a signal input means and a plurality of first switch means mounted thereon, and all the segments of the second being similar and each segment having a plurality of different load means, a plurality of different D.C. bias means and a plurality of second switch means mounted thereon.

4. Test apparatus in accordance with claim 3 in which the first and second boards are releasably connected together by connector pins extending between said boards.

5. Test apparatus in accordance with claim 1 in which the socket means includes a third circuit board to which a socket member is connected, said third board being releasably connected to the second board through said connectors.

6. Test apparatus in accordance with claim 5 in which the socket member is mounted on the third circuit board and said third board is attached to the second board by a plurality of connector pins.

7. Test apparatus in accordance with claim 5 in which the third circuit board is connected to the second board by a plurality of spring biased plungers and the socket member is positioned in a closed test chamber.

8. Test apparatus for automatically testing electronic devices, in which the improvement comprises:
   probe means including a first circuit board having a plurality of signal measurement probes and associated switches mounted thereon for selectively connecting said probes to the electronic device under test;
   load means including a second circuit board connected to said first board means and having a plurality of different loads and associated switches mounted thereon for selectively connecting said loads to the device under test;
   socket means for releasably connecting the device under test to a plurality of active terminals on said second board which are electrically connected to the terminals of said device under test; and
   said second board having a plurality of ground terminals electrically connected to ground and positioned between said active terminals so that any two adjacent active terminals are separated by a ground terminal.

9. Test apparatus in accordance with claim 8 in which the probe means includes a mounting ring attached to the first board and the probes are releasably mounted in a plurality of receptacles attached to the mounting ring at positions spaced around said ring so that said probes extend radially outward from said ring.

10. Test apparatus in accordance with claim 9 in which the mounting ring is a metal memeber connected to an electrical ground.

11. Test apparatus in accordance with claim 10 in which a plurality of coaxial cables are connected to cable connectors attached to the first board between said probes around the mounting ring.

12. Test apparatus in accordance with claim 8 in which the socket means includes a third circuit board releasably connected to said second board, a socket member is mounted on one side of said third board, and a fourth circuit board is attached to the other side of the third board so that it extends substantially perpendicular thereto and a plurality of load impedances are mounted on said fourth board for connection to the socket member.

13. Test apparatus in accordance with claim 1 in which the control means includes an electronic computer means connected to a programmable D.C. power supply and to a programmable pulse generator for causing said power supply to apply different D.C. currents and voltages to the bias means on said second board and for causing said pulse generator to apply different pulses to the signal input means on said first board.

14. Test apparatus in accordance with claim 1 in which the measurement means includes a dynamic measurement system connected through a multiplexer means to the probes.

15. Test apparatus in accordance with claim 14 in which the probes are signal sampling probes containing sampling gates, and the dynamic measurement system includes signal sampling means for applying interrogation gate pulses to the sampling gate for sampling different portions of the waveform of an input signal applied to the gate to cause sample pulses corresponding to said portions to be transmitted through the said sampling gate, and for storing said sample pulses in a memory means to produce an output signal of lower frequency than the input signal and having substantially the same waveform as said input signal.

16. Test apparatus in accordance with claim 15 in which the dynamic measurement system also includes a start-stop comparator means connected to the output of the memory means of at least one sampling means for comparing selected start and stop points on the output signal waveform with reference signals to measure an amplitude or time characteristic of the output signal.

17. Test apparatus in accordance with claim 16 in which the dynamic measurement system includes a cathode ray tube display means connected to the output of the sampling memory means and to the output of the start-stop comparator means for displaying on said tube the waveform of said output signal and the start and stop points on said waveform.

18. Test apparatus in accordance with claim 16 in which the dynamic measurement system includes a digital counter means connected through a counter gate to the output of a standard pulse generator producing pulses of a known frequency, and the output of the start-stop comparator means is connected to said counter gate to open such gate only during the time between said start and stop points so that the counter reading corresponds to the value of said characteristic.

19. Test apparatus in accordance with claim 1 in which the measurement means includes a D.C. measurement system connected through coaxial cables and other switch means mounted on said first board to said socket means.

20. Test apparatus in accordance with claim 1 in which the load means include a plurality of load sockets releasably mounted on the second board and having the load elements of one load attached to each of such load sockets.

21. Test apparatus in accordance with claim 20 in which at least some of the load elements are active circuit elements similar to the device under test.

22. Test apparatus in accordance with claim 1 in which the device under test is an integrated circuit device.

* * * * *